No. 617,761.   M. MUSGREAVE.   Patented Jan. 17, 1899.
PIPE COUPLING.
(Application filed Dec. 28, 1897.)
(No Model.)

Witnesses.   Inventor.
Mark Musgreave
Attorney.

UNITED STATES PATENT OFFICE.

MARK MUSGREAVE, OF PHILADELPHIA, PENNSYLVANIA.

PIPE-COUPLING.

SPECIFICATION forming part of Letters Patent No. 617,761, dated January 17, 1899.

Application filed December 28, 1897. Serial No. 663,857. (No model.)

*To all whom it may concern:*

Be it known that I, MARK MUSGREAVE, of the city and county of Philadelphia, State of Pennsylvania, have invented an Improvement in Pipe-Couplings, of which the following is a specification.

My invention relates to pipe-couplings; and it consists of the improvements which are fully set forth in the following specification and are shown in the accompanying drawings.

My invention is particularly designed to enable pipes to be coupled together or uncoupled with ease and facility and to dispense with the ordinary elbow-couplings usually employed when pipes are to be coupled in an angular relation. It is an object of my invention in attaining this result to provide a coupling which is strong and tight and shall not be liable to leak and which may be easily adjusted to couple pipes either in line or in various angular positions.

In carrying out my invention I employ two coupling members each composed of a tubular piece having a coupling end adapted for connection with the pipe end and a flange-plate through the face of which the passage-way of the tubular piece opens. These two coupling-pieces are placed with the flange-plates in contact and are fastened together by fastening-bolts passing through holes in the flange-plates, but not passing through the tubular passage-way of the two pieces. By providing the flange-plates with a series of holes I am able to readily adjust the plates to bring the coupling ends into various angular positions or into a straight line with one another to suit the requirements of the work.

The great difficulty in adjustable or "universal" pipe-couplings has been the liability to leak; but in my coupling as the fastening-bolts do not pass through the tubular passage-ways of the members, but only through the flange-plates thereof, as tight a coupling as may be desired is obtainable, while the coupling possesses all the adjustability that is required.

Figure 1:
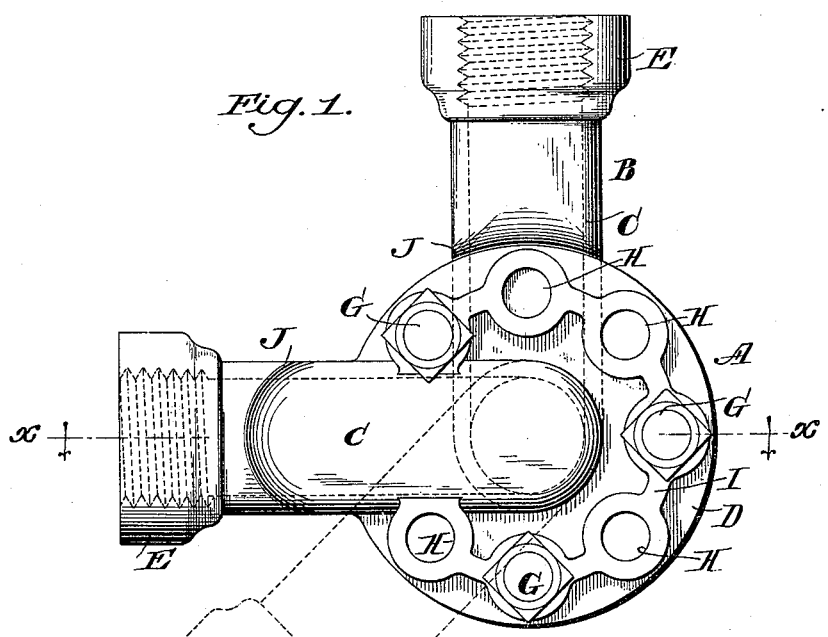
Figure 2:
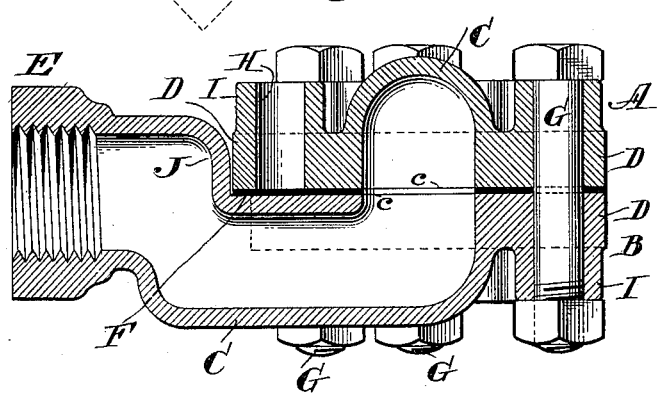

In the accompanying drawings, Figure 1 is a plan view of a coupling embodying my invention, and Fig. 2 is a transverse sectional view of the same on the line $x$ $x$ of Fig. 1.

The coupling is composed of two similar pieces A and B, each consisting of a tubular piece C and flange-plate D, through which the passage $c$ of the tubular piece C passes. Each tubular piece C terminates in a coupling end E, which is shown internally threaded and adapted to receive a pipe end.

In applying the coupling the two flange-plates D D are placed upon one another, with an interposed packing-ring F between, and are secured by bolts G G, passing through them. To facilitate the securing of the plates D D together and to enable them to be adjusted to vary the angular relation of the coupling ends E E, each flange-plate may be provided with a series of bolt-holes H H, so that the positions of the coupling ends E E may be changed with reference to one another according to the demands of the work, as indicated in full and dotted lines in Fig. 1, while the bolt-holes in one flange-plate D will be opposite those of the other in the various positions in which the plates are adjusted. The coupling is thus adapted to the varying conditions of the work to which it is applied and may be used for coupling pipes in line as well as at right angles to one another, as shown in full lines in Fig. 1, or at intermediate angles, as indicated in dotted lines, and owing to the presence of the series of bolt-holes the adjustment may be made with accuracy and great facility.

The outer face of each flange-plate D is preferably provided with a raised rib I, through which the bolt-holes extend. This enables the bolt-heads and nuts at the holes adjacent to the tubular portions C C to clear the metal at those points and permits bolts of the same length to be used at the intermediate points, thus avoiding the very objectionable use of bolts of different lengths.

To bring the coupling ends E E in the same plane when the parts are coupled, the tubular pieces C C are bent upward beyond the inner faces of flange-plates D D, as at J, and terminate in the ends E E, which are thus located approximately in a plane passing between the flange-plates.

As has been pointed out, the bolts G G do not pass through the passage-ways $c$ of the members, which would be liable to cause weakness and leakage as well as to require careful packing. My coupling therefore, while possessing the advantage of adjustability, is perfectly tight and strong.

The details of construction shown may be varied without departing from the invention.

What I claim as new, and desire to secure by Letters Patent, is as follows:

1. The combination of two coupling-pieces, composed of flange-plates D adapted to be bolted together and tubular portions C having openings c through the flange-plates, and having their outer ends bent upward and outward as at J across the plane of the flange-plates, whereby the ends of said tubular portions will lie in substantially the same plane with one another when the coupling-pieces are united together by the flange-plates.

2. A coupling-piece composed of a plate D, having an opening c and a tubular portion C leading from the opening c and having its outer end J bent upward and outward across the plane of the plate D.

3. The pipe-coupling consisting of the two members A, B, each composed of a tubular piece C and a flange-plate D provided on its outer face with a raised rib I and having a series of bolt-holes passing through the raised rib, and fastening-bolts G passing through bolt-holes of the flange-plates and holding the two members together with the faces of the flange-plates in contact.

In testimony of which invention I hereunto set my hand.

MARK MUSGREAVE.

Witnesses:
ERNEST HOWARD HUNTER,
J. W. KENWORTHY.